E. J. WATSON & R. F. DOWNEY.
TIRE INFLATING MECHANISM.
APPLICATION FILED FEB. 10, 1913.
1,082,983.
Patented Dec. 30, 1913.
2 SHEETS—SHEET 2.
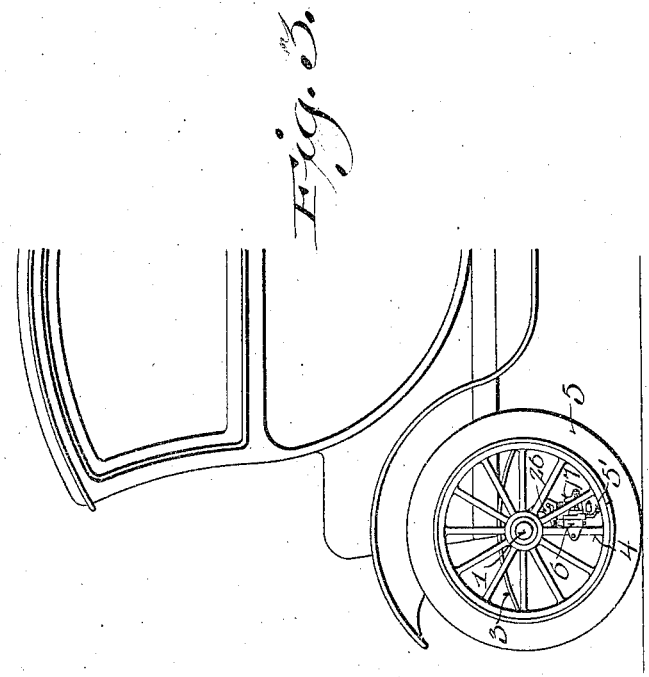
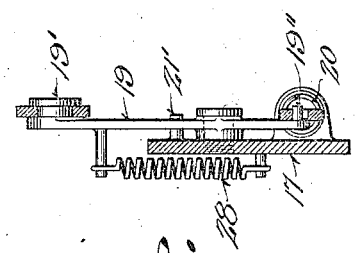

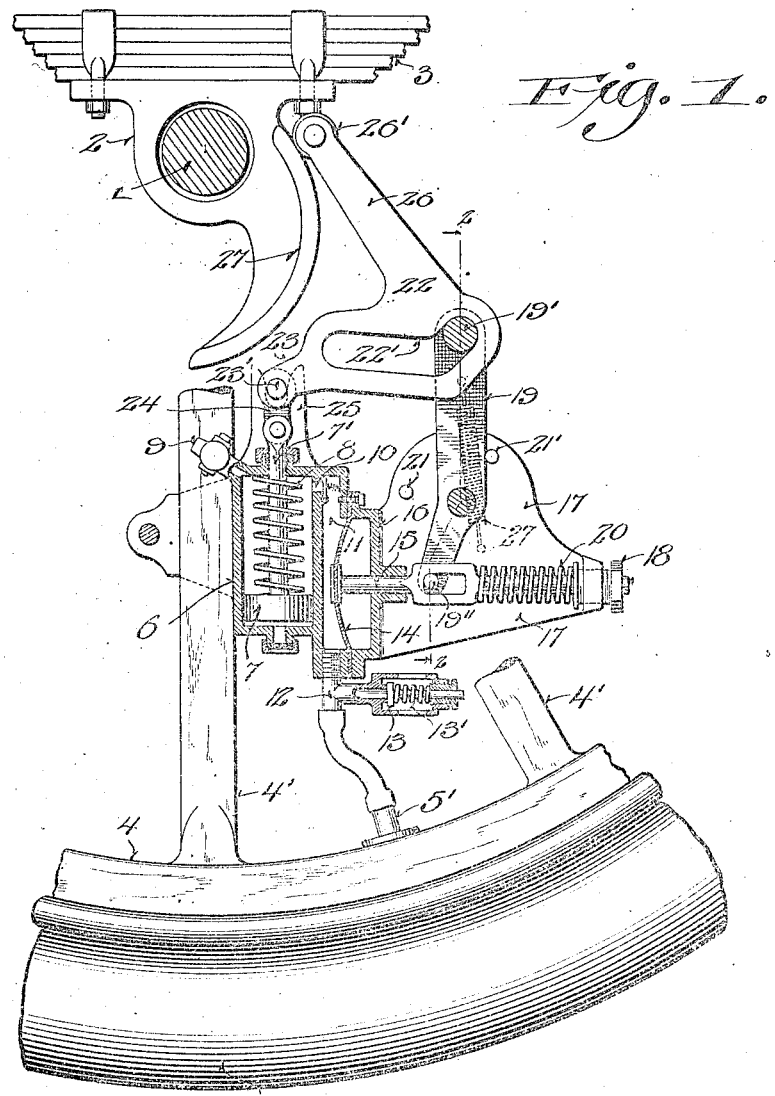

UNITED STATES PATENT OFFICE.

EDWARD J. WATSON AND RICHARD F. DOWNEY, OF MILWAUKEE, WISCONSIN; SAID DOWNEY ASSIGNOR OF ONE-HALF OF HIS RIGHT TO WILLIAM O. SISSON, OF MILWAUKEE, WISCONSIN.

TIRE-INFLATING MECHANISM.

1,082,983.  Specification of Letters Patent.  Patented Dec. 30, 1913.

Application filed February 10, 1913. Serial No. 747,383.

*To all whom it may concern:*

Be it known that we, EDWARD J. WATSON and RICHARD F. DOWNEY, both citizens of the United States, and residents of Milwaukee, in the county of Milwaukee and State of Wisconsin, have invented certain new and useful Improvements in Tire-Inflating Mechanism; and we do hereby declare that the following is a full, clear, and exact description thereof.

Our invention has for it's object to provide simple, economical and effective means for automatically maintaining a predetermined air pressure within a pneumatic tire, the construction and arrangement being such that by the provision of a relief or pressure-controlling valve for the tire a pump-actuating means is automatically stopped and started coincident to variation of air pressure within the tire whereby the pressure is predeterminedly maintained.

With the above object in view the invention consists in certain peculiarities of construction and combination of parts as set forth hereinafter with reference to the accompanying drawings and subsequently claimed.

In the drawings Figure 1 represents an enlarged fragmentary sectional view of a portion of a vehicle wheel, an axle having attached thereto mechanism embodying the features of our invention; Fig. 2, a detailed cross-section of the same, the section being indicated by line 2—2 of Fig. 1, and Fig. 3 illustrates a vehicle upon a reduced scale showing one of the wheels equipped with a device made in accordance with our invention.

Referring by characters to the drawings, 1 represents an axle which is incased within a non-rotatory housing 2 that has mounted thereon the usual spring 3.

4 represents the felly of a wheel, which wheel is mounted upon the axle 1, said felly having the ordinary type of spokes 4' that are connected to the hub. Mounted upon the felly is a pneumatic tire 5 of any desired type having an inflating nipple 5' that extends through the wheel felly. Secured to one of the spokes is a pump-cylinder 6 having a piston-head 7 mounted therein, which piston-head is carried by a piston 7' that extends through a suitable gland in the head end of the cylinder. The piston-head is normally held at the bottom end of the cylinder by a coiled spring 8 which surrounds the piston and is interposed between the cylinder-head and piston-head as shown. The pump-cylinder is also provided with a check-valve controlled air inlet nipple 9 and a check-valve controlled discharge port 10, which discharge port communicates with a chamber 11 that in turn is connected to the tire nipple 5' by a pipe 12 having a flexible section. The pipe 12 also communicates with a pressure-controlling or relief valve 13. which valve is held to its seat by an adjustable spring 13'. One wall of the chamber 11 is formed by a diaphragm or flexible piston-head 14 having connected thereto a plunger-rod 15 that is suitably guided in a cap 16 that also serves as a retainer for the diaphragm flexible piston 14. The plunger-rod is also supported at its outer end in an ear that extends from a bracket 17 which forms part of the cap, the ear being provided with a thimble 18 which is in threaded union therewith, through which thimble the plunger-rod is adapted to slide. Fulcrumed upon the bracket 17 is a lever 19, the upper free end of which has extending therefrom a fulcrum-stud 19'. The short arm of the lever 19 also carries a pin 19'' which engages a slot in the plunger-rod 15. As shown in Fig. 1, the plunger-rod and its diaphragm are normally forced inwardly against air pressure contained within the chamber 11 by a coiled spring 20, which coiled spring is interposed between a shoulder of the plunger-rod and the thimble 18, whereby said coiled spring may be adjusted as to tension. Movement of the lever 19 is limited in either direction by stop-lugs 21, 21', that extend from the bracket plate 17. Mounted upon the fulcrum-stud 19' is a floating bell-crank lever 22, the shank of said lever being formed with an angular fulcrum slot 22' for seating engagement with the stud. One arm 23 of the floating lever is connected to the pump piston-rod 7' by a pin 23' and link 24, and, as shown in Fig. 1 of the drawings, when the pump-piston is in its position of rest, in which position it is held by the spring, the pin 23' is seated within a crotched ear 25 that extends from the pump-cylinder, this connection being had to permit rock of the floating lever 22 within its crotched seat, under certain conditions, to be hereinafter described. The other arm 26 of the bell-crank lever carries an anti-friction roller 26' which is arranged to be engaged by a tappet-shoe 27 that in this instance is shown in the form of a fixed cam which extends from the housing.

From the foregoing description it is apparent that a predetermined air pressure can be maintained within the pneumatic tire and when said pressure is at normal it is apparent that the expansive force thereof will be exerted upon the diaphragm 14 in opposition to the coiled spring 20, which coiled spring is set to yield slightly below normal pressure. Hence the plunger 15 will be forced outwardly, whereby movement will be imparted to the lever 19 in the direction indicated by the arrow. After a predetermined movement in said direction the tappet engaging end of the lever will be quickly thrown forward to the limit of its movement, at which point it will be stopped by the lug 21. This quick movement of the lever, after it has been positively moved a predetermined distance by the plunger-rod, is effected through a coiled spring 28, which coiled spring is connected to the bracket 17 and lever in such position that it is caused to travel across the point of the fulcrum of said lever and thus the spring pressure being shifted, will complete the movement initially imparted to the lever by the plunger-rod 15. The said movement of the lever, owing to its fulcrum stud 19' being in engagement with the slot 22' will cause the bell-crank lever to rock upon its pin 23', whereby the anti-friction roller 26' carried at the end of arm 26 will be moved to a position where it will clear the tappet 27 incidental to rotation of the wheel. Hence the entire apparatus will remain inactive and in the before mentioned position, until such time as the air pressure within the tire will, through various causes, rise above normal. Should rise in pressure take place, it is apparent that the relief or pressure-controlling valve, which is set to open above normal pressure, will act and thus permit the escape of air until such time as the pressure is reduced within the chamber 11, whereby the spring 20 controlling the plunger-rod 15 will act to force said plunger forward and thus impart movement to the lever 19, whereby its fulcrum stud 19' will cause the bell-crank lever to assume the position shown in Fig. 1, in which position its anti-friction roller 26' is moved so as to be engaged by the tappet and hence thereafter with each rotation of the wheel the bell-crank lever will be oscillated upon its fulcrum-stud to cause a pumping operation, which operation is continuous until the desired amount of air pressure has been supplied, to again restore the proper amount of air to the pneumatic tire.

It is apparent also that more than one tappet may be utilized whereby the strokes of the pump with each rotation of the wheel may be increased. It is also apparent that we may without departing from the spirit of our invention utilize other specific means for accomplishing the desired result other than that shown.

We claim:

1. In a wheel having a pneumatic tire, a pump in communication with the tire carried by the wheel, a fixed tappet-shoe, and a pump-actuating bell-crank having one end adapted to be brought into and out of engagement with the tappet; the combination of a shiftable pivot-stud for the bell-crank lever, and pneumatically controlled means for shifting the stud in one direction.

2. In a wheel having a pneumatic tire, a pump in communication with the tire carried by the wheel, a fixed tappet-shoe, and a pump-actuating bell-crank lever having one end adapted to be brought into and out of engagement with the tappet; the combination of a pneumatically controlled shiftable fulcrum stud for the bell-crank lever, and a coiled spring for accelerating movement of said stud in either direction.

3. In a wheel having a pneumatic tire, a pump in communication with the tire carried by the wheel, a fixed tappet-shoe, and a pump-actuating bell-crank lever having one end adapted to be brought into and out of engagement with the tappet; the bell-crank lever being provided with a slot; the combination of a fulcrum stud for the bell-crank lever engageable with the slot, and pneumatically controlled actuating mechanism for shifting the position of the fulcrum stud in said slot.

4. In a wheel having a pneumatic tire, a pump in communication with the tire carried by the wheel, a fixed tappet-shoe, and a pump-actuating bell-crank lever having one end adapted to be brought into and out of engagement with the tappet; the combination of a pivoted lever, a fulcrum stud for the bell-crank carried by the pivoted lever, a coiled spring having one end fixed and its opposite end in connection with the lever, the coiled spring being adapted to travel across the pivot point of said lever, whereby its movement is accelerated, stop-pins for said pivoted lever, and a pneumatically controlled actuating means for the aforesaid pivoted lever whereby initial movement is imparted to the same to shift the position of the bell-crank fulcrum stud.

In testimony that we claim the foregoing we have hereunto set our hands at Milwaukee in the county of Milwaukee and State of Wisconsin in the presence of two witnesses.

EDWARD J. WATSON.
   RICHARD F. DOWNEY.

Witnesses:
 GEO. W. YOUNG,
 M. E. DOWNEY.